No. 887,094. PATENTED MAY 12, 1908.
R. HUFF.
MOTOR VEHICLE.
APPLICATION FILED AUG. 21, 1907.

2 SHEETS—SHEET 1.

Witnesses
J. G. Hinkel
Milton Sitters

Inventor
Russell Huff
By Foster Freeman Watson & Coit
Attorneys

No. 887,094. PATENTED MAY 12, 1908.
R. HUFF.
MOTOR VEHICLE.
APPLICATION FILED AUG. 21, 1907.
2 SHEETS—SHEET 2.
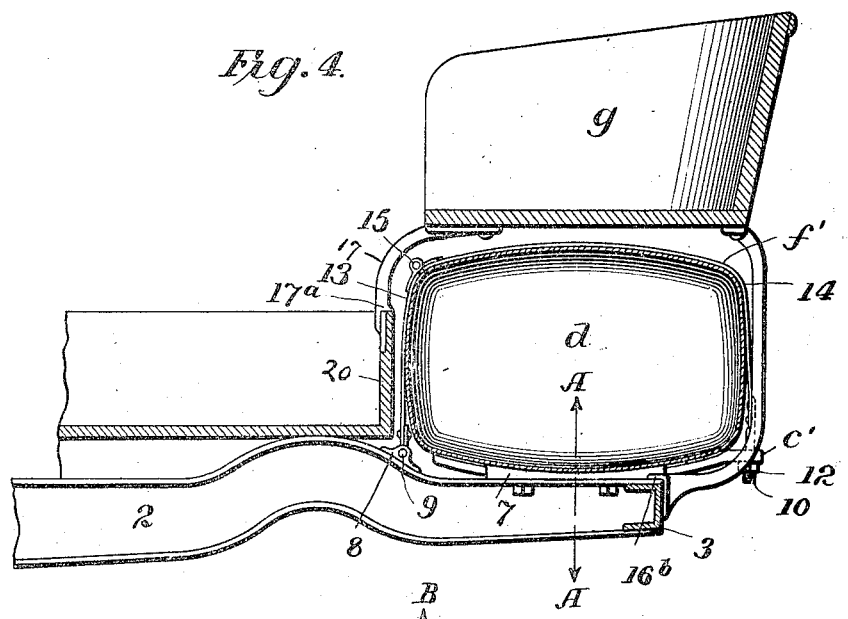
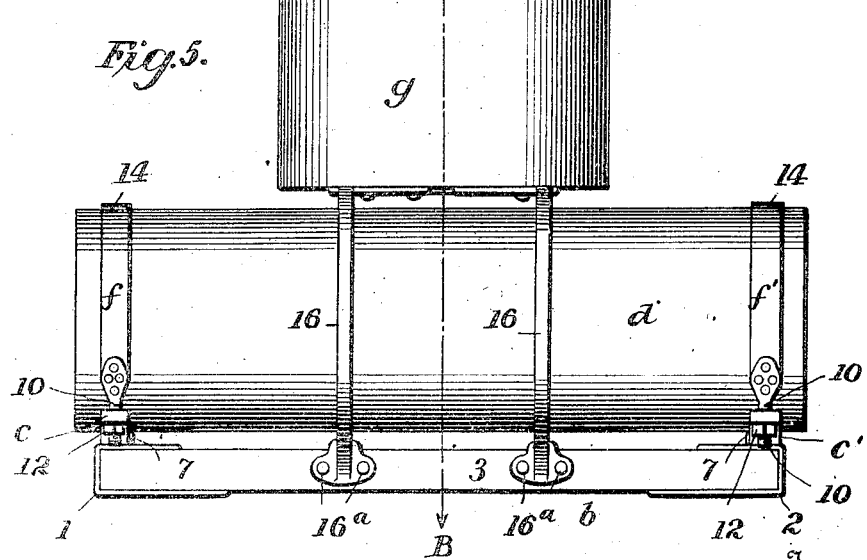
Witnesses
Inventor
Russell Huff
Attorneys

UNITED STATES PATENT OFFICE.

RUSSELL HUFF, OF DETROIT, MICHIGAN, ASSIGNOR TO PACKARD MOTOR CAR COMPANY, DETROIT, MICHIGAN, A CORPORATION OF WEST VIRGINIA.

MOTOR-VEHICLE.

No. 887,094.     Specification of Letters Patent.     Patented May 12, 1908.

Application filed August 21, 1907. Serial No. 389,561.

To all whom it may concern:

Be it known that I, RUSSELL HUFF, a citizen of the United States, and resident of Detroit, Wayne county, Michigan, have invented certain new and useful Improvements in Motor-Vehicles, of which the following is a specification.

This invention relates to improvements in means for supporting and securing fuel tanks upon motor vehicles, and also to certain features of construction the details of which will be hereinafter pointed out.

Figure 1:
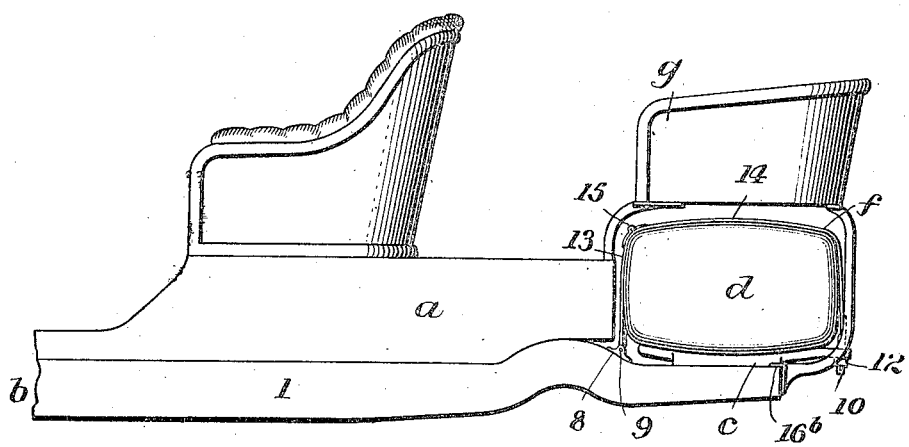
Figure 2:
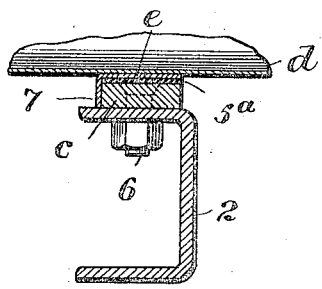
Figure 3:
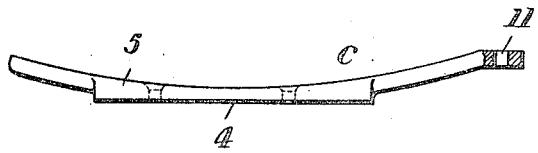

In the accompanying drawing, Figure 1 is a side elevation of a portion of the frame and body of a motor vehicle, with the fuel tank in position beneath the rear seat; Fig. 2 is a section on the line A A of Fig. 4; Fig. 3 is a side view of one of the tank supports; Fig. 4 is a section on the line B B of Fig. 5, and Fig. 5 is a rear view of the frame, tank and rear seat.

Referring to the drawing $a$ indicates the body of the vehicle and $b$ indicates the vehicle frame, which latter comprises the side channel-bars 1 and 2, extending to the rear of the vehicle body, and the cross bar 3 which connects the ends of the side bars. Upon the side bars 1 and 2, at the rear of the vehicle body, are arranged tank supports or saddles $c$ and $c'$, respectively. The supports are preferably of the form shown most clearly in Figs. 2 and 3 and each support consists of a metal bar having a flattened surface 4 on its lower side adapted to fit against the side bar of the vehicle frame and having a concave upper surface 5 which forms a seat for the fuel tank $d$. The upper surfaces of the supports are preferably covered with leather, or other suitable material for deadening sound and preventing wear, this covering being indicated at $5^a$ in Fig. 2. The supports are secured to the side bars by bolts 6, the heads of which are counter-sunk in the supports as indicated in dotted lines, Fig. 2. The tank $d$, as shown, is somewhat longer than the width of the vehicle frame and, in cross section, it is preferably of the form shown in Fig. 4, the top, bottom and sides being somewhat convex, the bottom having the same curvature as the upper surfaces of the supports. As shown in Fig. 5, the end portions of the tank rest upon the supports, and in order to provide bearing surfaces on the tank and to prevent endwise movement of the tank, metal strips $e$ are arranged transversely upon the bottom of the tank and suitably secured thereto by soldering or otherwise, these strips having downwardly turned flanges 7 which fit against the inner or adjacent sides of the supports and thus prevent endwise movement of the tank.

In order to secure the tank firmly against its seats on the supports, metal straps $f$ and $f'$, preferably covered with leather, are provided. The straps are alike in construction and similarly arranged and secured. Immediately at the rear of the vehicle body, upon each side bar, is secured a bracket 8 which carries a cross pin 9, to which one end of the strap is loosely secured. The strap extends over the top of the tank, and a threaded bar or bolt 10, secured to its opposite end, extends through an opening 11 in the rear end of the tank support. By means of the nuts 12 upon the threaded extensions of the straps the straps may be tightened so as to hold the tank firmly in position against the supports. Each strap is made in two parts, 13 and 14 and these parts are connected by a hinge 15 which is located at the top of the forward side of the tank. The purpose of this hinged construction is to enable the tank to be removed and inserted without entirely removing the straps or bending them out of shape. As the upright parts 13 of the straps are arranged between the tank and the body of the vehicle, it will be seen that if the straps were continuous they would either have to be bent out of shape or removed, in order to insert the tank, whereas, by making each strap in two parts and hinging the parts together at the top of the upright portion 13, the part 14 may be loosened from the tank support and moved upwardly out of the way of the tank.

The rear seat $g$, commonly known as the tiger seat, is arranged directly over the tank upon two standards 16, connected to the rear portion of the seat and to the bar 3 of the vehicle frame, and upon a standard 17, secured centrally to the front portion of the seat and to the body of the vehicle. These standards, or brackets, are curved, as shown, so as to clear the front and rear sides of the tank and leave an unobstructed space beneath the tiger seat for the accommodation of the tank. The brackets 16 are secured by bolts $16^a$ to the bar 3 of the frame and they are provided with lips or flanges $16^b$ which rest upon the end bar and relieve the bolts of vertical pressure. In the same way, and for the same purpose, the bracket 17 is provided with a lip or flange 17ª which rests upon the rear cross board 20 of the vehicle body.

What I claim is,—

1. The combination with a motor vehicle frame, of a fuel tank arranged transversely on the rear end portion thereof, and one or more metal straps for securing said tank, each strap comprising two parts, hinged together, one of said parts extending over the tank and downwardly on one side thereof, and the other part extending downwardly on the opposite side of the tank, the ends of the strap being suitably connected to the frame.

2. The combination with a motor vehicle frame, of a fuel tank arranged transversely on the rear end portion thereof, and one or more metal straps for securing said tank, each strap comprising two parts, hinged together, one of said parts extending over the tank and downwardly on one side thereof, and the other part extending downwardly on the opposite side of the tank, one end of the strap being permanently connected to the frame and the other end being detachably connected thereto.

3. The combination with a motor vehicle frame, of a fuel tank arranged transversely on the rear end portion thereof, and one or more metal straps for securing said tank, each strap comprising two parts, hinged together, one of said parts extending over the tank and downwardly on the rear side thereof, and having its end detachably connected to the frame, and the other part extending downwardly on the front side of the tank and having its end connected to the frame.

4. The combination with a motor vehicle frame, of a fuel tank supported thereon at the rear of the vehicle body and extending crosswise of the frame and metal straps for securing said tank, each strap comprising a part secured to a side bar of the frame and extending upwardly at the front side of a tank, and a part extending over the tank and downwardly on the rear side thereof, said latter part having a bolt at its end for connection to the frame, the parts of said strap being connected by a hinge joint located at the top of the front side of the tank.

5. In a motor vehicle, a pair of saddles or supports arranged upon the side bars of the frame at the rear of the vehicle body, a tank having its end portions resting upon said saddles, and a pair of metal straps for securing said tank, each strap having one end secured to a side bar of the frame in front of the tank, and having its other end detachably connected to the rear end of one of said saddles.

6. In a motor vehicle, a pair of saddles or supports arranged upon the side bars of the frame at the rear of the vehicle body, a tank having its end portions resting upon said saddles, and a pair of metal straps for securing said tank, each strap having one end secured to a side bar of the frame in front of the tank, and having its other end detachably connected to the rear end of one of said saddles, each strap comprising two parts hinged together at the top of the forward side of the tank.

7. The combination with a motor vehicle frame, of saddles or supports arranged upon said frame at the rear of the vehicle body, an oblong fuel tank arranged transversely of the frame upon said supports, means for preventing endwise movement of the tank, and straps adapted to extend over the end portions of the tank, and hold the latter against its supports.

8. The combination with a motor vehicle frame, of saddles or supports arranged upon said frame at the rear of the vehicle body, an oblong fuel tank arranged transversely of the frame upon said supports, said tank having depending flanges connected thereto for engaging the sides of the supports, and one or more straps adapted to extend over the tank and hold the latter against the supports.

9. The combination with a motor vehicle frame, of saddles or supports arranged upon the rear end of said frame, a fuel tank having metal strips on its lower side adapted to rest on said supports, said strips having depending flanges adapted to engage the sides of said supports and prevent movement of the tank transversely of the vehicle, and straps for preventing upward movement of the tank relatively to its supports.

10. The combination with a motor vehicle frame, of saddles or supports arranged lengthwise of the frame at its rear end, the upper surfaces of said supports being concave, a fuel tank having a convex lower surface, adapted to rest on said supports, and straps extending over said tank for preventing upward movement of the tank relatively to its supports.

11. In a motor vehicle an oblong fuel tank arranged transversely of the vehicle frame, and a seat arranged over the central portion of the tank, said seat having a forward leg or bracket secured to the vehicle body, and a pair of legs or brackets extending between the rear end of the frame and the rear portion of the seat.

12. In a motor vehicle, a seat arranged centrally of the vehicle, at its rear end, a fuel tank extending transversely of the vehicle beneath said seat and at the rear of the vehicle body, and straps extending over the ends of said tank, at each side of said seat, each strap having a hinge joint near the top of the forward side of the tank.

In testimony whereof I affix my signature in presence of two witnesses.

RUSSELL HUFF.

Witnesses:
 MILTON TIBBETTS,
 CLARA I. DALE.